No. 752,653. PATENTED FEB. 23, 1904.
H. J. S. CASSAL.
APPARATUS FOR DELIVERING MEASURED QUANTITIES OF LIQUID.
APPLICATION FILED MAR. 17, 1903.
NO MODEL. 2 SHEETS—SHEET 1.

Witnesses:

Inventor:

No. 752,653. Patented February 23, 1904.

UNITED STATES PATENT OFFICE.

HANS JOHN STEPHEN CASSAL, OF LONDON, ENGLAND, ASSIGNOR TO THE LIQUID (ELECTRIC) REGISTER SYNDICATE, LIMITED, OF LONDON, ENGLAND.

APPARATUS FOR DELIVERING MEASURED QUANTITIES OF LIQUID.

SPECIFICATION forming part of Letters Patent No. 752,653, dated February 23, 1904.

Application filed March 17, 1903. Serial No. 148,239. (No model.)

*To all whom it may concern:*

Be it known that I, HANS JOHN STEPHEN CASSAL, a subject of the King of Great Britain, residing at 13 Eton Villas, South Hampstead, London, England, have invented new and useful Improvements in and Connected with Apparatus for Delivering Measured Quantities of Liquid, of which the following is a specification.

This invention relates to improvements in and connected with apparatus for delivering measured quantities of liquid, and has for its object to so construct such apparatus that at each operation only the predetermined quantity of liquid shall be delivered, means being also provided for indicating or recording the total quantity of liquid delivered.

According to the invention we provide a chamber or box the effectual capacity of which is equal to the specific volume of liquid to be delivered at each operation of the apparatus. This chamber is in communication with the tank or the like containing the liquid to be delivered through the medium of one or more suitable taps or cocks, preferably comprising a casing and a hollow plug, both casing and plug having openings which can be brought opposite one another to open the cock and allow liquid to flow from the tank to the chamber or be separated from one another to cut off such flow. The delivery-pipe from the chamber is fitted with a tap the plug of which is so connected with that of the chamber-cock that when the said tap is turned on the cock is turned off, and vice versa, means being also provided whereby the delivery-tap cannot be turned on until the box or chamber is filled with liquid or turned off until all the liquid—that is to say, the measured quantity—has been discharged from the box. We also use in combination with the tap a suitable device for recording the number of times it is turned on or off.

Figure 1:
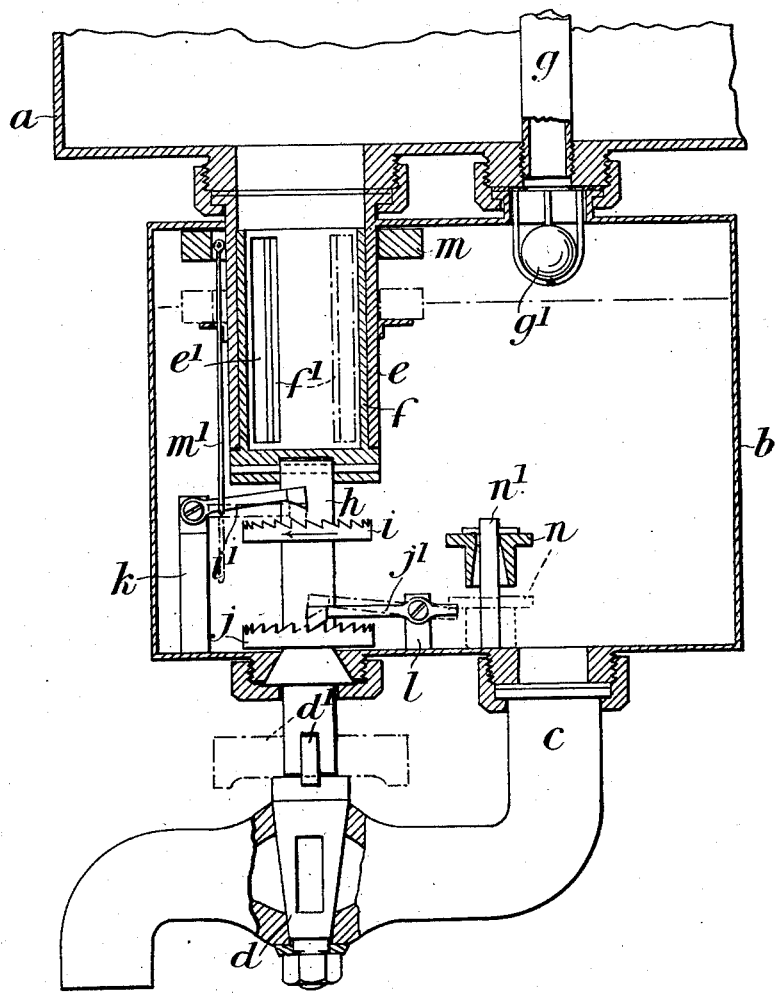
Figure 2:
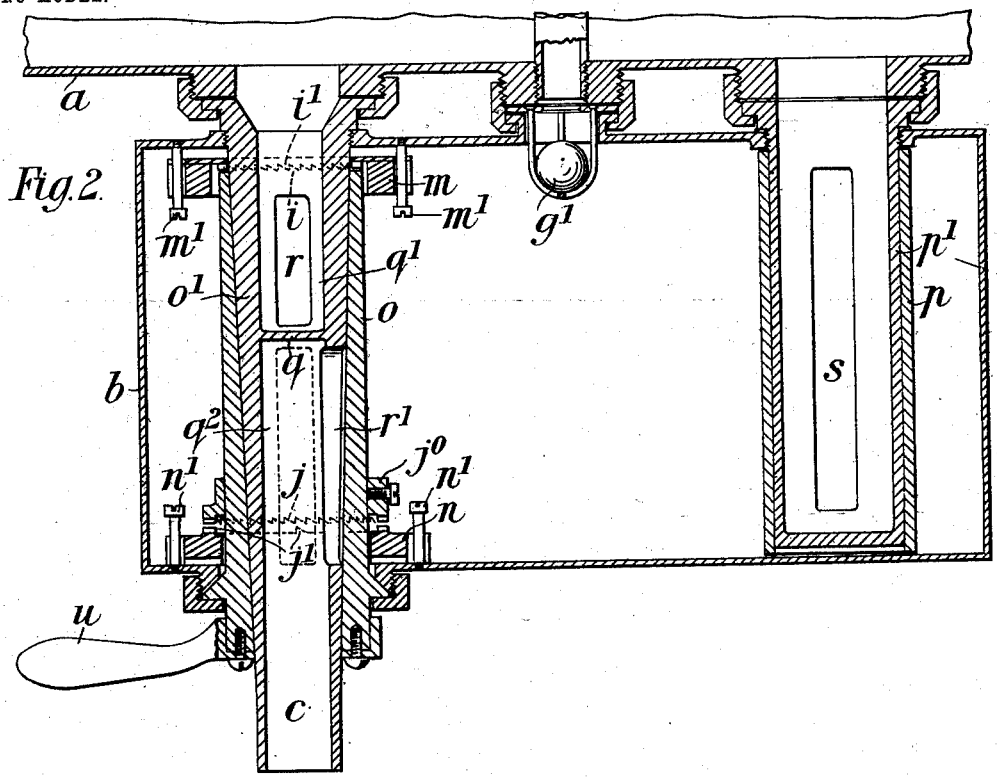
Figure 3:
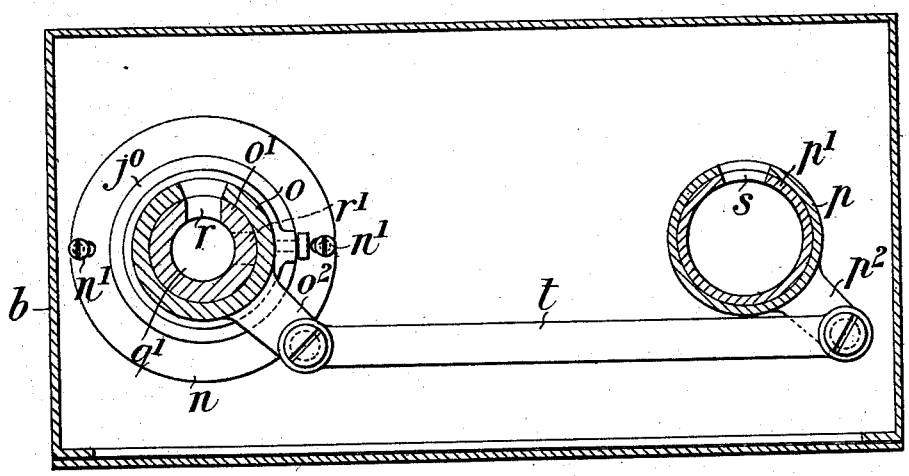

In the accompanying drawings, Figure 1 is a vertical section of apparatus constructed according to the invention, and Figs. 2 and 3 are respectively a vertical and horizontal section of a modified construction of the apparatus.

Referring first to the arrangement shown in Fig. 1, $a$ is the tank containing the liquid from which measured quantities are to be delivered and which may be, for example, a traveling petroleum-tank for delivering petroleum to dealers, and $b$ is the chamber, the effectual capacity of which is equal to the specific volume of liquid which is to be delivered at each operation of the apparatus. $c$ is the outlet-pipe, which extends from the bottom of the chamber $b$ and which is fitted with the discharge-cock $d$, having the handles or key $d'$. $e$ is the valve-casing, by means of which the chamber $b$ is placed in communication with the bottom of the tank $a$, and $f$ is the hollow plug, which fits in the said casing $e$ and which is adapted to be rotated therein. $e'$ is the opening which is provided in the casing $e$, and $f'$ is a corresponding orifice or opening which is formed in the plug $f$. By turning the plug $f$ in the casing $e$ the two openings $e'$ $f'$ can be brought opposite one another, so as to allow liquid to flow from the tank $a$ into the chamber $b$, or they can be turned so as to interrupt communication between the tank $a$ and chamber $b$. $g$ is an air-pipe which extends from the top of the chamber $b$ into the tank $a$ above the level of the liquid therein and which is fitted with the float-valve $g'$. The plug $f$ of the chamber-cock is provided with a downwardly-extending stem $h$, which passes through the bottom of the chamber $b$ and is secured to the plug of the delivery pipe or cock $d$, so that when the latter plug is turned by the key $d'$ the former plug $f$ is also rotated. This stem has keyed upon it inside the chamber $b$ two ratchet-wheels $i$ and $j$, the teeth of which incline in opposite directions. In conjunction with the ratchet-wheel $i$ there is arranged a gravity-pawl $i'$, which is pivoted upon the post $k$ in the chamber $b$, and in connection with the ratchet-wheel $j$ there is arranged a gravity-pawl $j'$, which is pivoted to the post $l$ in the chamber $b$. The arrangement is such that one pawl prevents the stem $h$ being turned in one direction and the other pawl prevents rotation in the other direction. The pawl $i$ is operated by a float $m$, which has depending from it a hooked rod $m'$, the hooked end of which passes over the pawl $i'$, that is lifted when the float $m$ is raised to its uppermost position (shown in full lines in the drawings) on the chamber $b$ having become filled with liquid through the valve or cock $e\ f$. The pawl $j''$ is disengaged from its ratchet-wheel $j$ through the medium of the float $n$, which is loosely mounted upon the upright pillar $n'$, fixed to the bottom of the chamber $b$, the said float being raised by the liquid when the chamber is being filled and being allowed to drop with the level of the liquid as the latter discharges, finally coming into contact with the tail of the pawl $j''$ when the chamber is emptied, so as to lift it out of engagement with the ratchet-wheel $j$, as shown in the broken lines in the figure.

The apparatus operates as follows: In the position shown in the drawings the cock $d$ is closed and the cock $f$ is opened, so that liquid has flowed from the tank $a$ and filled the chamber $b$, raising the float $m$ thereby and lifting the pawl $i'$ so as to release the ratchet-wheel $i$. The stem $h$ can therefore be turned in the direction indicated by the arrow, thus closing the cock $f$ by bringing the opening $f'$ into the position shown in broken lines and opening the cock $d$. The chamber $b$ then becomes emptied of liquid, and as the level drops the float $m$ falls into the position shown in broken lines, thus allowing the pawl $i'$ to fall by gravity into engagement with the ratchet-wheel $i$, and so prevent the turning of the stem $h$ in the direction shown by the arrow. On the level of the liquid further dropping the float $n$ falls to the position shown in broken lines, and thus lifts the pawl $j''$, thereby allowing the stem $h$ to be turned in the opposite direction to that indicated by the arrow to enable the cock $d$ to be shut off. It will thus be seen that the cock $d$ cannot be opened until the chamber $b$ has become filled with liquid—that is to say, until the specific volume of liquid has passed from the tank $a$ into the said chamber $b$—and that when the said cock $d$ is opened it cannot be again closed until the whole of the measured volume of liquid in the chamber $b$ has been discharged through the pipe $c$.

Figs. 2 and 3 illustrate a form of the apparatus designed to be used in cases where the measuring-box $b$ is large and it is essential that it should be filled rapidly. To this end two inlet-cocks are provided between the liquid-reservoir $a$ and the box or chamber $b$, the said cocks consisting of the two casings $o$ and $p$, respectively, in the former of which works the plug $o'$ and in the latter of which works the plug $p'$. The plug $o'$ extends through the bottom of the chamber or box $b$ and forms the discharge-outlet $c$. It is divided at about its center by a horizontal partition or diaphragm $q$, the upper chamber $q'$ so formed being the inlet-chamber of the cock and the lower chamber $q^2$ being the discharge-chamber. The chamber $q'$ is provided with the orifice $r$, which can be brought into communication with a corresponding orifice in the casing $o$, and the lower chamber $q^2$ is formed with the orifice $r'$, which can be brought into communication with a corresponding orifice in the casing $o$. The plug $p'$ is also provided with an orifice $s$, which can be brought into communication with a corresponding orifice in the casing $p$. The two casings $o$ and $p$ are connected together by means of arms $o^2$ and $p^2$ and a connecting-link $t$, so that when the casing $o$ is turned through the medium of the external handle $u$ the other casing $p$ is also turned in the same direction, so that both cocks are simultaneously operated. For simplicity and cheapness of construction the ratchet-teeth $i$ are formed upon the upper end of the casing $o$ and the pawl-teeth $i'$ are formed upon the upper part of the float $m$, as clearly shown in Fig. 2, the said float being guided by the pins $m'\ m'$, which depend from the top of the chamber $b$. Similar ratchet-teeth $j$ are formed upon a ring $j^0$, secured to the lower part of the casing $o$, and the pawl-teeth $j''$ are formed upon the upper part of the float $n$, which incloses the said casing $o$ and is guided upon the pins $n'$, secured to the bottom of the chamber $b$. The arrangement operates in a similar manner to that described with reference to Fig. 1—that is to say, when the chamber $b$ is empty the pawl-teeth $i'$ lock the casing $o$ against rotation in one direction, the pawl-teeth $j''$ being out of engagement with the ratchet $j$, so that the handle $u$ can be turned to open both cocks $o$ and $p$ and allow liquid to flow from the reservoir $a$ to fill the chamber $b$. When this is effected, the floats $m$ and $n$ are raised, thus allowing the handle $u$ to be turned in the opposite direction, so as to cut off the supply of liquid in the chamber $b$ and place the discharge-pipe $c$ in communication with the interior of the said chamber $b$, so that the contents thereof are run off. To enable the total quantity delivered to be indicated, we provide counting mechanism of ordinary construction, which is actuated from the stem $h$ in the arrangement illustrated in Fig. 1 and the movable casing $o$ in the arrangement shown in Figs. 2 and 3, this being preferably effected each time the cock is turned on. As such counting mechanism is well known, no further description thereof is necessary.

Having now particularly described and ascertained the nature of my said invention, and in what manner the same is to be performed, I declare that what I claim is—

1. The combination with a liquid-reservoir, of a measuring-chamber communicating therewith and provided with a discharge-cock, a cock interposed between said reservoir and measuring-chamber and operatively connected with said discharge-cock, two ratchets having oppositely-disposed teeth operatively connected with said discharge-cock, and float-operated pawls for engaging said ratchets, substantially as described.

2. The combination with a liquid-reservoir, of a measuring-chamber communicating therewith and provided with a discharge-cock, a cock interposed between said reservoir and measuring-chamber and operatively connected with said discharge-cock, two ratchets having oppositely-disposed teeth operatively connected with said discharge-cock, a pawl for each ratchet, a float for operating one of said pawls when the chamber is filled and a float for operating the other pawl when the chamber is emptied, substantially as described.

3. In apparatus for delivering measured quantities of liquid, the combination with the liquid-reservoir, of a chamber in communication with the said reservoir and having a discharge-pipe, a cock controlling the communication between the reservoir and chamber, a cock in the discharge-pipe, a common stem to the two cocks, the said stem being provided with a pair of ratchet-wheels having pawls which control the rotation of the stem in either direction, and of floats which alternately disengage the pawls on the chamber becoming emptied and filled with liquid, substantially as hereinbefore described.

4. The combination with a liquid-reservoir, of a measuring-chamber communicating therewith, two separate inlet-cocks interposed between said reservoir and measuring-chamber for rapidly filling the same, a discharge-cock for said chamber operatively connected with both of said inlet-cocks, two ratchets having oppositely-disposed teeth, operatively connected with said discharge-cock and float-operated pawls for engaging said ratchets, substantially as described.

5. The combination with a liquid-reservoir, of a measuring-chamber communicating therewith, two separate inlet-cocks interposed between said reservoir and measuring-chamber for rapidly filling the same, a discharge-cock for said chamber formed integrally with one of said inlet-cocks, a connection between said inlet-cocks for securing their simultaneous operation, a pair of ratchets having oppositely-disposed teeth, operatively connected with said discharge-cock and float-operated pawls for engaging said ratchets, substantially as described.

HANS JOHN STEPHEN CASSAL.

Witnesses:
JOHN E. BOUSFIELD,
C. G. REDFERN.